July 9, 1963 R. J. KANE 3,096,780
MEANS FOR INTRODUCING CHLORINE INTO WATER
Filed June 2, 1960 6 Sheets-Sheet 1

INVENTOR.
ROBERT J. KANE
BY
ATTORNEY

July 9, 1963
R. J. KANE
3,096,780
MEANS FOR INTRODUCING CHLORINE INTO WATER
Filed June 2, 1960
6 Sheets-Sheet 2
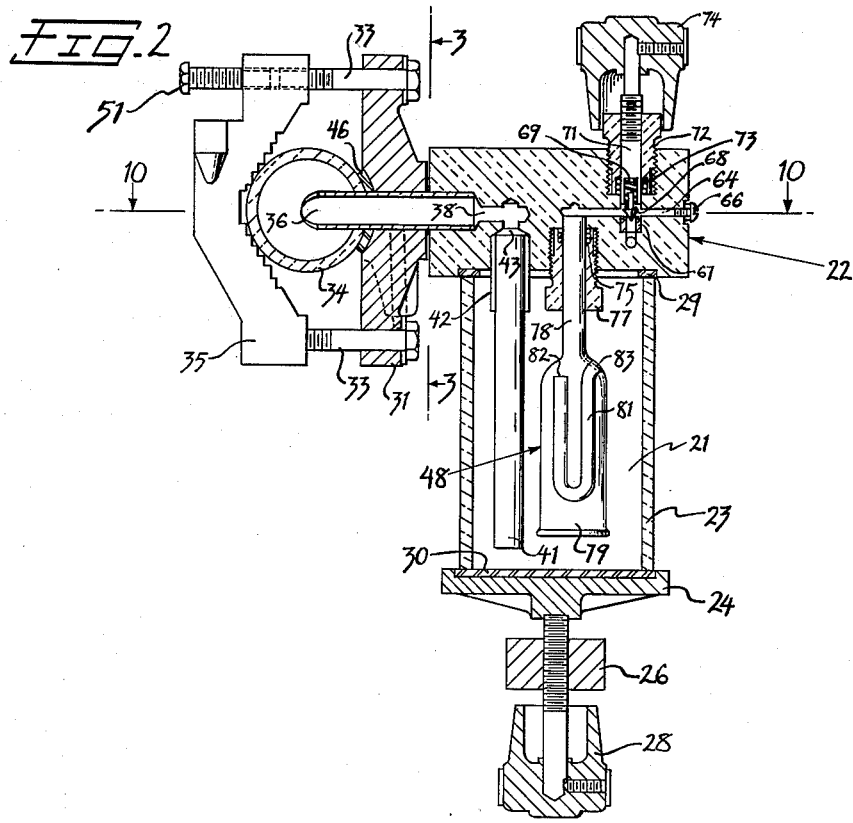
INVENTOR.
ROBERT J. KANE
BY
ATTORNEY

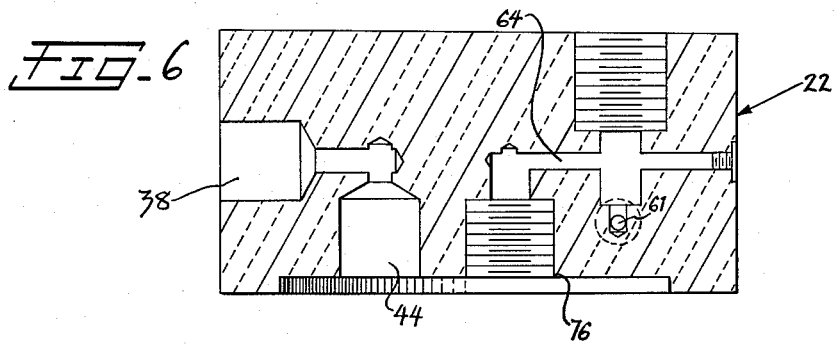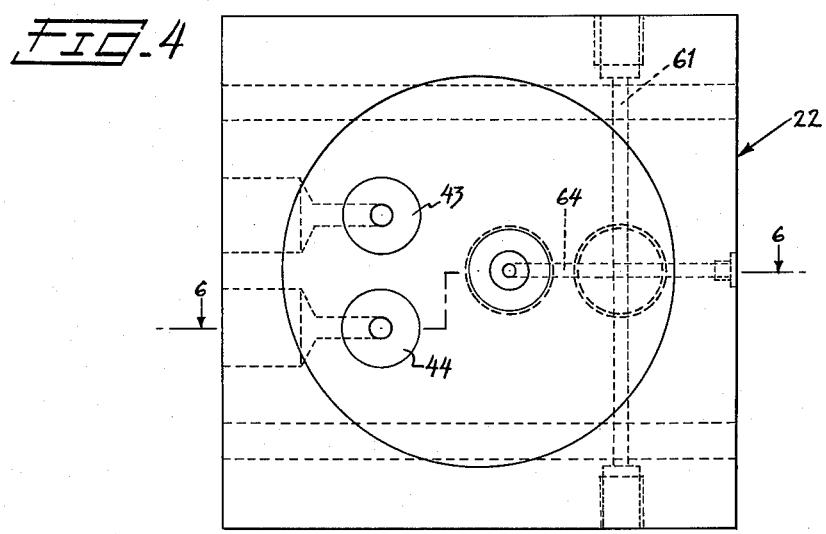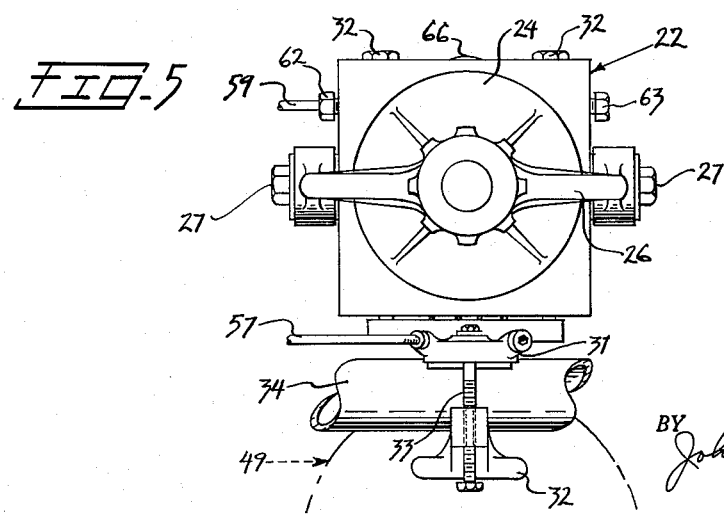

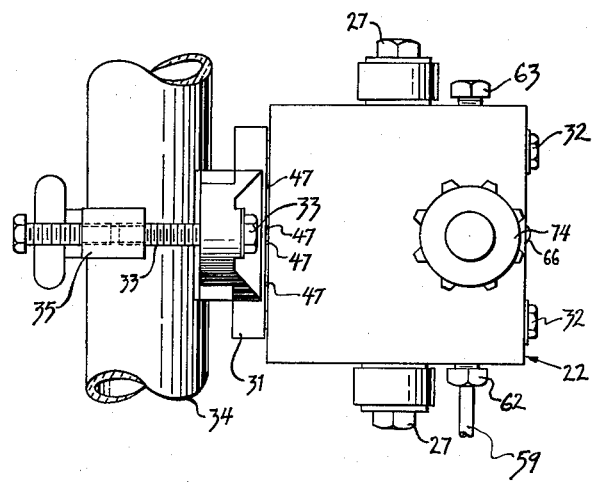
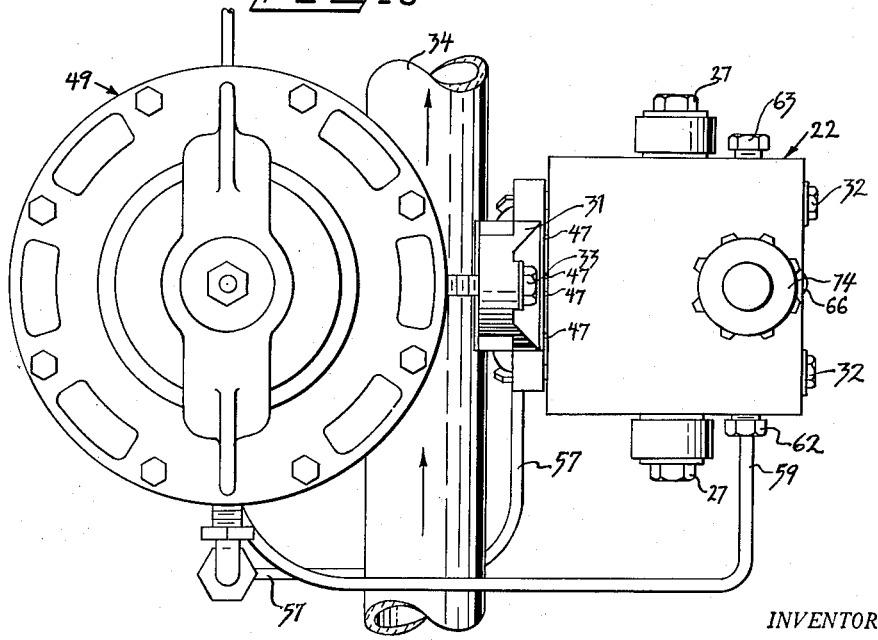

July 9, 1963  R. J. KANE  3,096,780
MEANS FOR INTRODUCING CHLORINE INTO WATER
Filed June 2, 1960  6 Sheets-Sheet 5
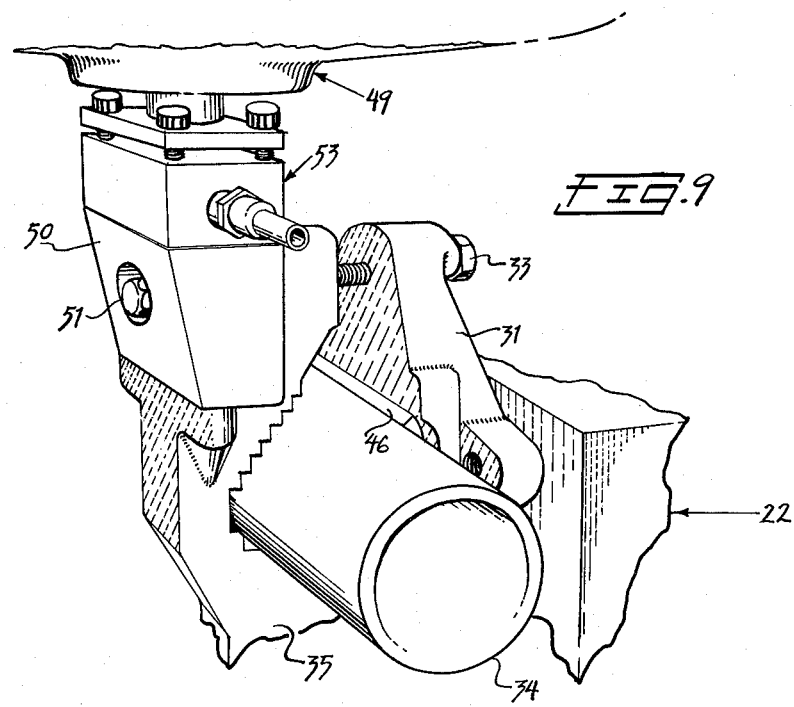
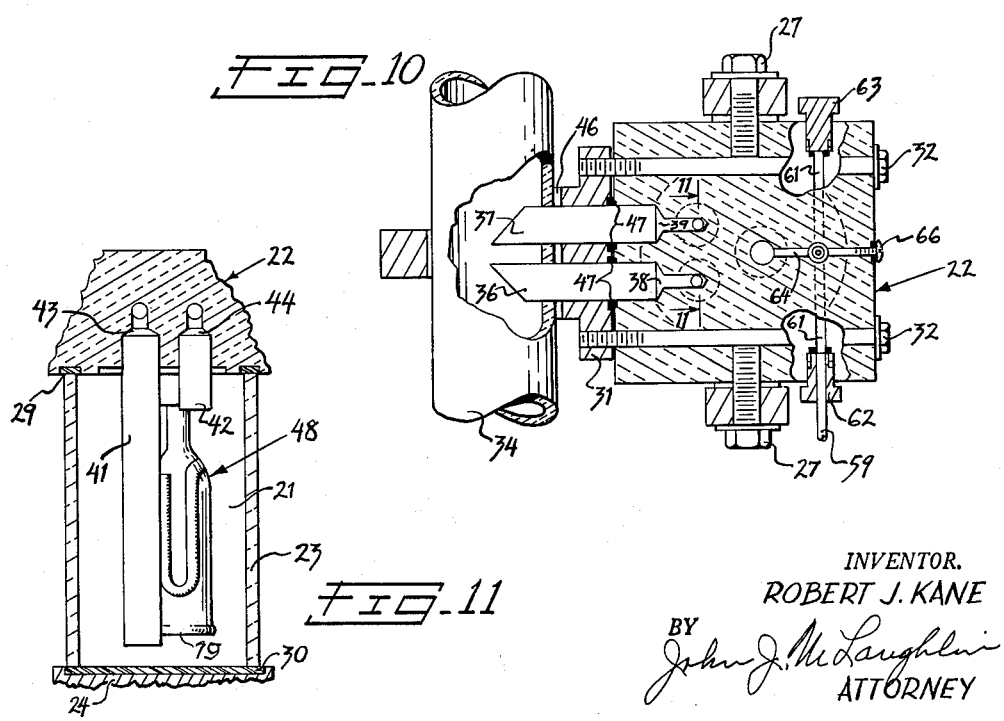
INVENTOR.
ROBERT J. KANE
BY John J. McLaughlin
ATTORNEY July 9, 1963 R. J. KANE 3,096,780
MEANS FOR INTRODUCING CHLORINE INTO WATER
Filed June 2, 1960 6 Sheets-Sheet 6

INVENTOR.
ROBERT J. KANE
BY John J. McLaughlin
ATTORNEY 3,096,780
MEANS FOR INTRODUCING CHLORINE INTO WATER
Robert J. Kane, 2908 E. Pinchot, Phoenix, Ariz.
Filed June 2, 1960, Ser. No. 33,596
7 Claims. (Cl. 137—209)

My invention relates to a means for treating water, and more in particular to an improved means for introducing chlorine gas into swimming pool water.

Various methods and expedients have been used to control the sanitary condition of water such as water in swimming pools. Given a reasonably uncontaminated supply of make-up water, suitable filtering and the control of the chlorine content of pool water are enough to maintain sanitary conditions. In large installations, such as municipal water systems, relatively complex and expensive equipment is used for introducing chlorine gas in required amounts. To control the chlorine content of water in swimming pools, particularly relatively small private or semi-private pools, available methods and equipment have not been fully satisfactory. The chlorine requirements for a given body of swimming pool water is determined by the dirt load, the bathing load evaporation, and some other minor factors; and a common practice in the case of small private pools is to utilize a chlorine compound which liberates chlorine when introduced in a dry form into the swimming pool water. The result generally is either an over supply of chlorine which is irritating to mucous membranes or an under supply of chlorine which introduces a health hazard. Substantially continuous introduction of gaseous chlorine is much more desirable if it can be done inexpensively and safely.

The principal object of my invention, therefore, is to provide an improved method of and means for introducing chlorine in gaseous form into swimming pool water.

Another object is the provision of relatively inexpensive equipment for introducing chlorine into swimming pool water but which equipment may also be used in related types of installations when gas under pressure is to be introduced into contact with a liquid.

A still further object is the provision of relatively inexpensive equipment of the type identified which is readily adjustable by an unskilled person to provide a proper quantity of gas.

A further object is the provision of such equipment which by relatively minor adjustment is operable to control requirements to water bodies of various sizes.

A still further object is the provision of the equipment of the type identified which will automatically limit the supply of chlorine gas if make-up water or circulation water should fail.

Other specific objects and features of the invention will be made apparent from the following detailed description taken with the accompanying drawings wherein, FIG. 1 is an elevational view showing a preferred embodiment of my invention;

FIG. 2 is a vertical sectional view taken on the line 2—2 of FIG. 1, with the pressure responsive diaphragm valve removed;

FIG. 3 is a sectional view taken on the line 3—3 of FIG. 2 looking in the direction of the arrows;

FIG. 4 is a bottom plan view of the head block showing its actual size;

FIG. 5 is a bottom plan view of the chlorinator;

FIG. 6 is an irregular sectional view through the head block taken on the line 6—6 of FIG. 4;

FIG. 7 is a plan view of the chlorinator with the pressure responsive valve removed;

FIG. 8 is a similar view showing the pressure responsive valve in position;

FIG. 9 illustrates one form of bracket which may be used to support the pressure responsive valve;

FIG. 10 is a plan sectional view taken on the line 10—10 of FIG. 2 showing the manner in which the water flow is controlled;

FIG. 11 is a fragmentary sectional view taken on the line 11—11 of FIG. 10 looking in the direction of the arrows;

Figure 1:
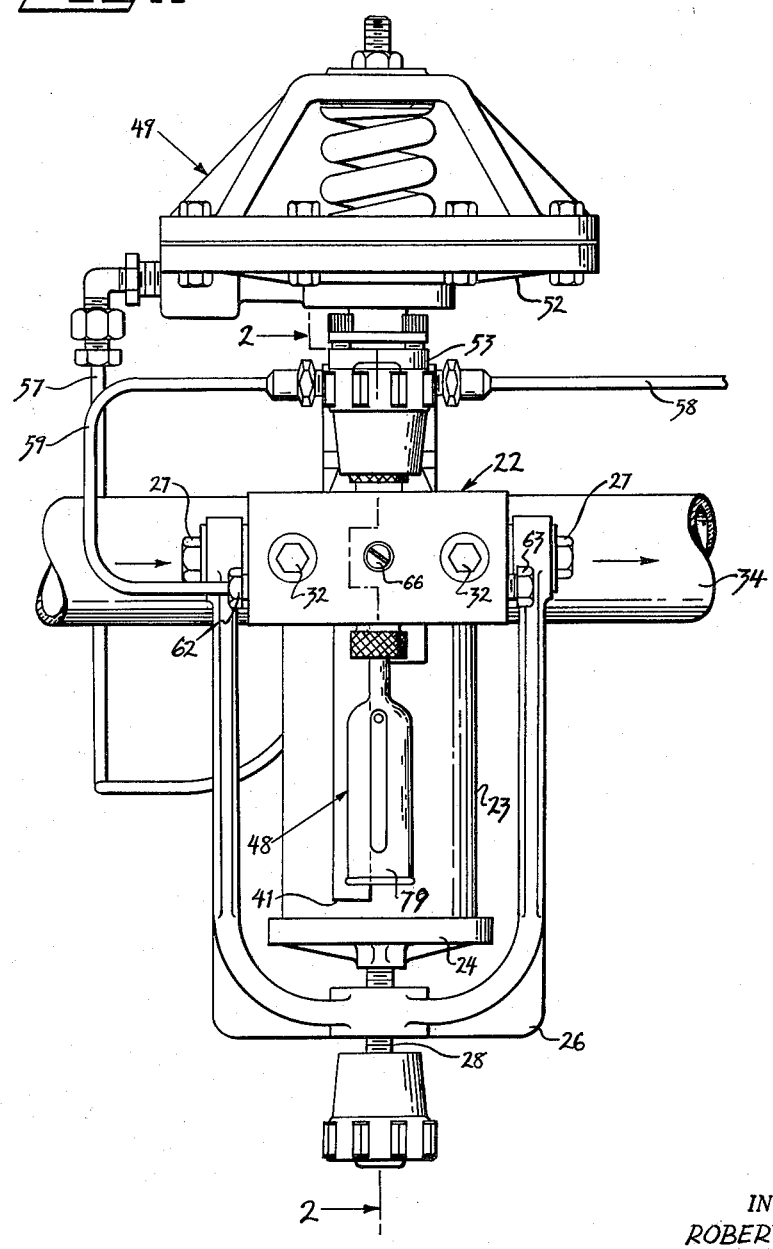

Referring now to the drawings, a liquid and gas mixing chamber 21 (FIGS. 2 and 11) is formed by a head block referred to generally by the reference character 22, a glass tube 23, a chamber cap 24, held together by a yoke in the form of a bracket 26 hinged to the head block at 27. A headed screw 28 engages a boss at the bottom of cap 24 to hold the parts in assembled relation. A gasket 29 is provided between the top of tube 23 and the head block 22, and a disk 30 of synthetic rubber or the like material supplies the functions of both gasket and liner to protect the cap 24 from attack by the corrosive chlorine-water combination. In the operation of the device, water and chlorine in metered quantities are brought into the mixing chamber 21 and the controlled density mixture or solution then delivered to the main body of water, such as in a swimming pool.

The head block 22 is supported on a bracket 31 by two long cap screws 32 (FIG. 10) which extend entirely through the head block and engage in such bracket 31. A second bracket 35 is secured to bracket 31 by cap screws 33 (FIG. 2), and the two brackets 31 and 35 act as mounting brackets to support the entire assembly to a water pipe 34, which may be any pipe moving circulating or make-up water into the swimming pool—preferably a pipe carrying circulating water which has just passed through a filter bed and is being returned to the swimming pool.

To circulate water into and out of the mixing chamber 21 a water system is provided comprising tubes 36 and 37 (FIG. 10) which are frictionally held in annular recesses 38 and 39 respectively in the head block 22. Similarly a relatively long tube 41 and short tube 42 are frictionally held in annular bottom recesses 43 and 44 respectively in the head block. Recesses 38 and 43 are connected by borings within the block (FIG. 2) so that water entering into the tube 36 will be discharged at the bottom of tube 41; while recesses 39 and 44 are also connected by borings within the head block (FIG. 6) so that water discharged through tube 42 will be returned to pipe 34 through tube 37. The tubes 36 and 37 extend through the bracket 31 and into the pipe 34 through apertures provided therein. To prevent leakage along the path of these tubes 36 and 37, a suitable rubber gasket 46 and O rings 47 are provided. The structure shown assumes movement of the water through the pipe 34 in the direction shown by the arrows, and the oblique opening of tube 36 will cause water to be delivered into the mixing chamber 21 through tube 41. The circulating water in the mixing chamber 21 will normally have a level at about the bottom of tube 42, and will pass out through such tube and connecting passage ways through tube 37 and thence back to pipe 34. Thus, there will be a continuous circulation as long as water flows in pipe 34. It will also be noted that with the tubes 36 and 37 constructed as shown, flow will be induced regardless of the direction of flow of the water. If, however, the water should flow in the opposite direction to that indicated, then the tubes 41 and 42 should be interchanged to control the water to the proper level in the mixing chamber 21. If the tubes 41 and 42 are made the same length, as they may be if desired, then such interchange of tubes is unnecessary.

For swimming pool use, chlorine is provided in tanks containing 100 to 150 pounds of chlorine at about 100 pounds pressure at a normal ambient temperature of 70° to 80° Fahrenheit. Employing such a source of chlorine or any available source under adequate pressure, I meter the amount of chlorine fed to the water passing through the mixing chamber, by utilizing a metering tube indicated generally by the reference character 48 having the function, as will be explained, of permitting a definite volume of chlorine to be delivered to the mixing chamber in a series of pulses. Given a known volume of chlorine at each pulse, the amount of chlorine delivered to satisfy requirements of a particular installation becomes a function of the number of pulses in a given time period.

As shown in the drawings (FIGS. 1 and 8), a diaphragm control valve indicated generally by the reference character 49 is secured to the mounting bracket 35 by means of an attaching bracket 50 attached to bracket 35 by cap screw 51. The diaphragm control valve may be of any suitable type such as a Bantam No. 156 manufactured by G. W. Doll of Bristol, Rhode Island, providing, however, that the diaphragm is constructed of a material resistant to the chlorine laden water; such as plastic of the type known commercially as "Teflon" or a material of the type known commercially as "Hosteloy C," and providing further that the surfaces with which the water comes into contact are suitably protected as by the application of a silver coating. Because of common knowledge of the construction and operation of a valve of this type, details of construction have not been shown. The valve, however, includes a diaphragm housing 52 into which the controlling liquid under pressure is lead and a valve 53, which controls the passage of the chlorine gas therethrough in response to pressure within the housing 52.

To control the operation of the diaphragm valve 49 a pair of passageways 54 (FIG. 3) are provided in the bracket 31. These passages communicate with the apertures in the bracket 31 through which the circulating water moves, but they may be closed by Allen screws 56 when not required. In any case, when the diaphragm valve 59 is used it is connected to the passage 54 on the up side of pipe 34, the down side passageway being closed by one of the Allen screws 56. When the valve 49 is used, a tube 57 interconnects the diaphragm chamber 52 and the aperture 54 which is in contact with the incoming water pressure. When this water is flowing, therefore, the valve 53 is held open and the chlorine gas can pass through.

Chlorine gas under pressure from the source (not shown) passes through supply tube 58 through valve 53 and into tube 59 which leads from the valve 53 to a transverse passageway 61 (FIG. 10) in the head block 22. A suitable attaching nut 62 is employed to make the attachment, the opposite end of the transverse passageway 61 being closed by a threaded plug 63. The transverse passageway 61 in turn connects with a feed passageway 64 bored from the outside and running at right angles thereto. The exterior passage 64 is closed by a screw 66 so that gas entering through tube 59 has no outlet except into the mixing chamber 21 through the passageways shown.

At the point whereby passageways 61 and 64 cross, there is an enlarged vertical tubular passageway containing a valve seat 67 (FIG. 2), which is interposed between the transverse incoming passageway 61 and the feed passageway 64. A valve 68 is pressed against the seat 67 by a coil spring 69 within the end of a valve stem 71 threaded through packing nut 72. A plurality of O rings 73 in an annular recess in the packing nut 72 engage around the stem 71 and are compressed to prevent gas leakage between stem 71 and nut 72 or between nut 72 and the contiguous portions of the head block. The spring pressed valve 68 acts as a check valve to prevent the possibility of water entering the chlorine gas system. I may, however, employ a simple needle valve at this point, with a check valve between it and chamber 21, such as at the inner end passageway 64. The packing nut 72 is preferably molded of Keadastic and the seat 67 is formed of silver. The head block 22 may be molded of polyvinyl chloride or it should be protected where it comes into contact with wet chlorine. A cap 74 is secured to the stem 71 so that by turning the cap 74 the amount of gas passing through the valve may be controlled.

The feed passageway 64 is connected to a bottom threaded vertical recess 76 which received a locking nut 77 to hold the measuring tube 48 in a position to receive the chlorine gas. O rings 75 are employed to prevent gas leakage around the top of locking nut 77. The tube 48 includes a stem 78, an enlarged connecting bell shaped measuring chamber 79 and a U-shaped aspirating tube 81, one end of which is open near the top of the measuring chamber 79 and the other which is connected through the top side wall of the measuring chamber.

Figure 12:
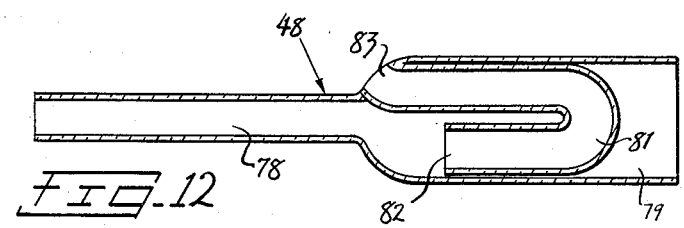
FIG. 12 shows the metering tube employed in the illustrated embodiment.

The measuring chamber as shown in FIGS. 1 and 2 is approximately ½ scale, but I have shown in FIG. 12 a full scale model of a measuring tube which, as will be explained, might be employed for a relatively large swimming pool installation. The measuring chamber in this particular tube is 1 inch in diameter, the bottom of the aspirating tube 81 is ½ inch from the bottom of the measuring chamber and the aspirating tube is 1 inch from its intake end 82 to the top portion of the curve leading to the outlet end 83. For convenience this will be called tube #1. The tubes shown in FIGS. 13 and 14, which shall be called tubes #2 and #3 respectively, represent modifications with different dimensions, and they have been given the same numbers as measuring tube 48 with, however, the prefix 1 and 2 applied in each instance. Each of tubes 2 and 3 has a measuring chamber ¾ inch in diameter and the critical dimensions in the aspirating tubes 182 and 183 are ¾ inch and 1¼ inch respectively.

In operating the device of the present invention, the tube 58 is connected to a source of chlorine under pressure such as a chlorine tank of commerce providing 100 to 150 pounds of chlorine and providing a chlorine gas under pressure as determined by ambient temperature. Approximately the following relationship of temperature to gas pressure exists:

| Temperature: | Pressure |
|---|---|
| 50° F. | 60# per sq. in. |
| 75° F. | 90# per sq. in. |
| 90° F. | 125# per sq. in. |
| 100° F. | 137# per sq. in. |
| 112° F. | 175# per sq. in. |
| 125° F. | 200# per sq. in. |

The amount of gas delivered in a given period is a function of the pressure of the incoming gas and the setting of valve 68. The chlorine tank is, therefore, perferably protected from direct exposure to sunlight so that reasonably uniform pressure conditions, or at least minimum pressure differentials, will be maintained. Generally speaking, however, when the equipment is adjusted in the manner described hereinbelow pressure differentials responsive to normal temperature changes in a given 24 hour period can be tolerated. This is particularly so because the period of maximum pressure will occur during the day or early evening when the maximum bathing load is encountered, and decreased feeding of chlorine responsive to decreased pressure is not objectionable during the period when the bathing load is low. By reasonable protection of the equipment, however, substantially constant temperature and pressure conditions may be maintained.

Assuming that water is flowing from left to right in the pipe 34 looking at FIG. 1, and assuming also that the pipe 34 looking at FIG. 1, and assuming also that the automatic pressure control valve 49 is used, the left hand passageway 54 (FIG. 3) is interconnected by tube 57 to valve housing 52. Flow of water in the pipe 34 will deliver water under slight pressure through tube 57 and hold the valve 49 in operating position so that chlorine gas may flow from tube 58 through valve 53 through tube 59 and then into the head block 22 through passageway 61. When the water is flowing in the manner postulated the tubes 41 and 42 will be inserted in the openings 43 and 44 in the position indicated in FIGS. 2 and 10. This causes water also to enter the mixing chamber 21 through tube 41 and to leave the mixing chamber 21 through tube 42.

Since tube 42 is connected to the discharge tube 37 (FIG. 10) which is placed under a partial vacuum by the movement of the water, the water in the mixing chamber, while continuously passing through it, is maintained at about a level corresponding to the bottom of tube 42. Since the measuring chamber 79 is connected with the mixing chamber 21 both at its bottom and through the outlet end 83 of the aspirating tube 81, the measuring chamber 79 is also filled with water if there is no movement of chlorine gas passed the valve 68.

When the valve mechanism is set to permit gas to flow past the valve 68, such gas enters the stem 78 and moves down into the upper portion of the measuring chamber 79 at the same time forcing water downwardly in such chamber and also downwardly in the aspirating tube 81 until the bend in the aspirating tube 81 is sufficiently uncovered to permit escape of gas therethrough. When this condition is reached, the gas is aspirated quickly in a pulsing fashion out through opening 83 and is discharged into the mixing chamber 21 where it becomes mixed with the water therein. As the gas is discharged through the outlet end 83 of the aspirating tube 81, there is a momentary reduction in the gas pressure above the water in the measuring chamber 79. This allows the water in the measuring chamber 79 to rise and force the remaining accumulated gas in the measuring chamber out through the aspirating tube, and this action, which is rapid, continues until the opening 82 of the aspirating tube 81 is covered with water. The water then seals the aspirating tube and prevents passage of further gas therethrough until the gas volume again builds up, forcing the water downwardly, and uncovering the bend in the aspirating tube to cause another gas pulse. The amount of gas at each pulse is generally the volume of the measuring chamber between the opening 82 and bend in the aspirating tube.

Figure 13:
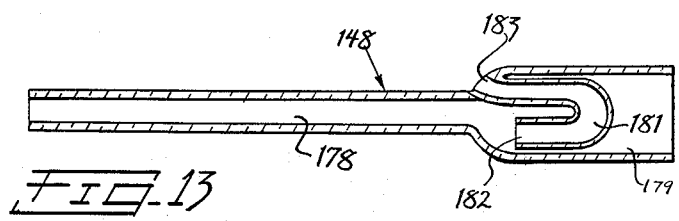
FIGS. 13 and 14 show other metering tubes usable with the disclosed embodiment.
Figure 14:
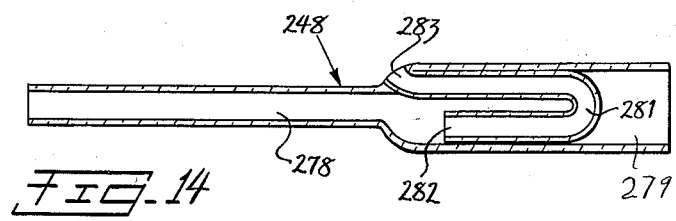

The gas laden water in the mixing chamber 21 is discharged through the vertical tube 42 and transverse tube 37 and into the pipe 34 through which the circulating or make-up water is moving. When the measuring tube 48 has been properly designed it delivers a known measured quantity of gas at each pulse, and by counting the pulses per minute or in any selected period the amount of gas delivered in 24 hours can be determined. With a given measuring tube, it is possible to control the feed over a wide range of requirements. I have, for example, been able to use the same tube to feed as little as 1/10 pound of chlorine per day and up to as much as 40 pounds of chlorine per day. Generally speaking, however, it is desirable to make a change in the tube size when extremely different ranges of requirements develop, rather than to depend on valve adjustment alone. I have found, for example, that an operating rate of in the neighborhood of 30 pulses a minute is a good basis on which to determine the charcteristics of a given tube. As an example, assuming the use of the tube shown in FIG. 12 in the environment disclosed 30 pulses per minute will result in the delivery of 8 pounds of chlorine in an 8 hour period. If, however, the tube shown in FIG. 13 is employed it will deliver 1½ pounds of chlorine in a 24 hour period when operating at the rate of 30 pulses. Under the same operating conditions, the measuring tube shown in FIG. 14 will deliver 3 pounds of chlorine per minute.

The ordinary small family swimming pool about 15' wide x 30' in length usually requires (in Arizona) about ½ pound of chlorine in a 24 hour period. Under these circumstances the tube shown in FIG. 13 would be used and the pulses adjusted to deliver ½ pound. Since the amount of chlorine is a direct function of the number of pulses, the basic conditions being known, 10 pulses per minute would deliver ½ pound of chlorine in a 24 hour period if the tube shown in FIG. 13 were employed.

The specific embodiment shown in the drawings may be modified in several respects depending upon the requirements of a particular installation. If desired, for example, the automatic control valve 49 can be deleted and the pipe 58 connected directly to the passageway 61 through attaching nut 62. The device will not now be responsive to control by water flow in the pipe 34, but at times such control is not necessary particularly in small installations. If it is more convenient to attach the device, for example, to the opposite side of pipe 34 then all that is necessary is to reverse the tubes 41 and 42 to maintain the proper water flow through the mixing chamber and to change the control tube 57 to the opposite passageway 54 in bracket 31. I have referred to the control made possible by changing the measuring tube 48. I have found that I can deliver as much as 50 pounds of chlorine in a 24 hour period under the operating conditions described above with 30 pulses per minute by merely changing the dimensions of measuring tube 48. If more than this amount of chlorine is required either the device may be enlarged in its entirety or optionally the glass tube 23 and its support may merely be lengthened to accommodate a longer measuring tube.

I am aware that many of the general features of my invention have been used before, particularly in relatively large chlorine treatment installations, but within my knowledge no one has provided a package unit in which the unit and its various parts combine to produce the advantages of my invention. One of the features and advantages of the combination is that it is simply installed on any part or either side of any water line through which pool water is circulated. All that is necessary is to drill or punch two holes in the water line, attach the device, connect the chlorine supply line to a source of chlorine under pressure, turn the water on and check adjustment of the chlorine flow. If the direction of flow of the water is such as to require it, tubes 41 and 42 are reversed so that incoming water is delivered through the longer tube. The installation guarantees delivery of water to the chamber as long as water is flowing in the pipe, and, when the valve 49 is used, cut off of chlorine if water circulation should be interrupted.

The structural features of the unit also simplify servicing of the device if such requirement should develop. The provision of a control valve within the unit, instead of at the chlorine tank as in present practice, not only limits the possibility of service requirement, but facilitates servicing where necessary. I have found, for example, that valve assembly can be removed, a plug inserted in place of nut 72, and the regular valve adjustment on the chlorine gas tank depended on to control gas feed until the valve assembly can be replaced. Although servicing requirements are normally those involving adjustment, any part in the assembly is easily repaired or replaced. Very seldom will servicing require extensive work on the entire assembly, such as is frequently the case when various functional parts are separated from each other as is the case with systems now in use. Should the entire assembly require attention, however, a temporary service unit can be installed in a matter of minutes, and used until the removed unit has been serviced.

While the specific embodiment of the invention has been shown and described in detail, the scope of the invention is defined by the claims.

I claim:

1. A unit chlorinator adapted for attachment at a water circulation line comprising a mixing chamber, means for circulating water from said line through said mixing chamber and back to said line, a mixing tube in the said chamber having a stem, a measuring chamber open at its bottom depending from the stem, a U-shaped aspirating tube within the measuring tube having one open end extending upwardly toward the stem and one open end leading through said measuring chamber and communicating with the mixing chamber, and means for delivering gas under controlled pressure to said stem, whereby to cause chlorine gas to displace a measured volume of water within the measuring chamber and to pulse out into the mixing chamber through the aspirating tube.

2. A unit chlorinator adapted for attachment at a water circulation line comprising a head block, a capped tube secured to the head block to form a mixing chamber, tubes projecting from said head block into said water circulation line to receive water from and deliver water back to said water circulating line, a relatively long water intake tube connected through the head block to the said receiving tube, a relatively short discharge tube connected through the head block to said delivery tube, both said long and short tubes projecting downwardly from the head block into the mixing chamber, a chlorine metering tube projecting downwardly from the head block into the mixing chamber, a chlorine gas passageway through the head block, means exterior of the head block for connecting said passageway to a source of chlorine under pressure, and means associated with the head block for controlling the rate of gas flow through said passageway, said metering tube including a stem with its upper end in communication with said passageway, a bell shaped measuring chamber at the bottom end of the stem, and a U-shaped aspirating tube with one open end within the measuring chamber near the top thereof, and one open end sealed through the side wall of the measuring chamber and communicating with the mixing chamber.

3. A unit chlorinator adapted for attachment at a water circulation line comprising a head block, a capped tube secured to the head block to form a mixing chamber, tubes projecting from said head block into said water circulation line to receive water from and deliver water back to said water circulation line, a water intake tube connected by a passageway through the head block to the said water receiving tube, a water discharge tube connected by a passageway through the head block to said delivery tube, both said tubes projecting downwardly from the head block into the mixing chamber, a chlorine metering tube projecting downwardly from the head block into the mixing chamber, a chlorine gas passageway through the head block, means exterior of the head block for connecting said passageway to a source of chlorine under pressure, and means associated with the head block for controlling the rate of gas flow through said passageway, said metering tube comprising a stem with its upper end in communication with said chlorine passageway, an integral bell shaped measuring chamber at the bottom end of said stem and a U-shaped aspirating tube with one open end within the measuring chamber near the top thereof and one open end sealed through the side wall of the measuring chamber and communicating with water in said mixing chamber.

4. A unit chlorinator adapted for attachment at a water circulation line comprising a head block, a capped tube secured to the head block to form a mixing chamber, tubes projecting from said head block into said water circulation line to receive water from and deliver water back to said water circulation line, a water intake tube connected by a passageway through the head block to the said water receiving tube, a water discharge tube connected by a passageway through the head block to said delivery tube, both said tubes projecting downwardly from the head block into the mixing chamber, a chlorine metering tube projecting downwardly from the head block into the mixing chamber, a chlorine gas passageway through the head block, means exterior of the head block for connecting said passageway to a source of chlorine under pressure, means associated with the head block for controlling the rate of gas flow through said passageway, said metering tube comprising a stem with its upper end in communication with said chlorine passageway, an integral bell shaped measuring chamber at the bottom end of said stem and a U-shaped aspirating tube with one open end within the measuring chamber near the top thereof and one open end sealed through the side wall of the measuring chamber and communicating with water in said mixing chamber, and check valve means for preventing water from entering said chlorine gas passageway from said mixing chamber.

5. In a unit chlorinator of the character described, a mixing chamber, means for continuously passing water through said mixing chamber in such a manner as to maintain a level of water in said mixing chamber, a gas metering device comprising a stem projecting downwardly into said mixing chamber below the level of water therein, a bell shaped measuring chamber below said stem and integral therewith, said stem and bell shaped measuring chamber communicating with each other so that gas under pressure entering said stem flows downwardly into the measuring chamber and displaces water therein, a U-shaped aspirating tube in said measuring chamber with one open end near the top of the measuring chamber and one open end sealed through the side wall of the measuring chamber and communicating with the mixing chamber, and means for introducing gas continuously under reduced pressure to said gas metering device to cause the said gas to be delivered to the water in the mixing chamber in the form of pulses of gas as said water continues to flow at substantially a uniform rate through the mixing chamber.

6. A unit chlorinator adapted for attachment to a water circulation line to introduce a controlled amount of chlorine gas to a relatively small swimming pool, said chlorinator comprising a head block with bottom passageways communicating with a pair of side passageways therein, means forming an annular bottom seat on said head block surrounding said bottom passageways, a tube, a bottom cap for said tube, a yoke member pivoted to the head block and operable to releasably hold said cap against said tube and said tube against said head block seat to form a mixing chamber, an attaching half bracket secured to said head block, a pair of horizontal water tubes connected to said side passageways in the head block and extending through said half bracket, a second half bracket secured to said first mentioned half bracket to secure the said brackets around said water circulation line with said water tubes projecting into said water circulation line through a side opening therein, said horizontal water tubes having their ends within the water circulation line shaped and positioned to cause water to pass through one of said tubes, into the chamber and out through the second tube into the circulation line, means including a pair of tubes projecting downwardly from said bottom passageways in the head block for maintaining a level of water in the mixing chamber, a gas metering device in the mixing chamber comprising a stem projecting downwardly from the head block, an integral bell shaped measuring chamber at the bottom end of the stem and disposed below the level of water in the mixing chamber, a U-shaped aspirating tube with one open end within the measuring chamber near the top thereof, and one open end sealed through the side wall of the measuring chamber, and means for introducing gas under pressure to said stem to cause the gas to be released to the mixing chamber in a series of pulses of uniform volume and frequency without appreciably affecting the level of water in the mixing chamber nor the uniform flow of water therethrough.

7. A unit chlorinator adapted for attachment to a water circulation line to introduce a controlled amount of chlorine gas to a relatively small swimming pool, said chlorinator comprising a head block with bottom passageways communicating with a pair of side passageways therein, means forming an annular bottom seat on said head block surrounding said bottom passageways, a tube, a bottom cap for said tube, a yoke member pivoted to the head block and operable to releasably hold said cap against said tube and said tube against said head block seat to form a mixing chamber, an attaching half bracket secured to said head block, a pair of horizontal water tubes connected to said side passageways in the head block and extending through said half bracket, a second half bracket secured to said first mentioned half bracket to secure the said brackets around said water circulation line with said water tubes projecting into said water circulation line through a side opening therein, said horizontal water tubes having their ends within the water circulation line shaped and positioned to cause water to pass through one of said tubes, into the chamber and out through the second tube into the circulation line, means including a pair of tubes projecting downwardly from said bottom passageways in the head block for maintaining a level of water in the mixing chamber, a gas metering device in the mixing chamber comprising a stem projecting downwardly from the head block, an integral bell shaped measuring chamber at the bottom end of the stem and disposed below the level of water in the mixing chamber, a U-shaped aspirating tube with one open end sealed through the side wall of the measuring chamber, means for introducing gas under pressure to said stem to cause the gas to be released to the mixing chamber in a series of pulses of uniform volume and frequency without appreciably affecting the level of water in the mixing chamber nor the uniform flow of water therethrough, and means including a diaphragm valve responsive to flow of water through said horizontal water pipes for discontinuing delivery of gas to said metering device when circulation of water in said circulation line is stopped.

References Cited in the file of this patent
UNITED STATES PATENTS

| | | |
|---|---|---|
| 1,285,491 | Wallace | Nov. 19, 1918 |
| 1,746,186 | Bramwell | Feb. 4, 1930 |
| 1,917,704 | Dresher | July 11, 1933 |
| 2,083,412 | Wallace | June 8, 1937 |
| 2,212,374 | Louis | Aug. 20, 1940 |
| 2,240,808 | Sillers | May 6, 1941 |
| 2,782,016 | Iannelli | Feb. 19, 1957 |
| 2,843,138 | Gilman | July 15, 1958 |
| 2,889,995 | Borell | June 9, 1959 |
| 2,909,187 | Gillooly | Oct. 20, 1959 |